Nov. 22, 1949     A. S. BILGER     2,488,523
MONORAIL WHEEL

Filed Aug. 18, 1947     2 Sheets-Sheet 1

INVENTOR.
ANSON S. BILGER
BY
Thomas Castberg
ATTORNEY

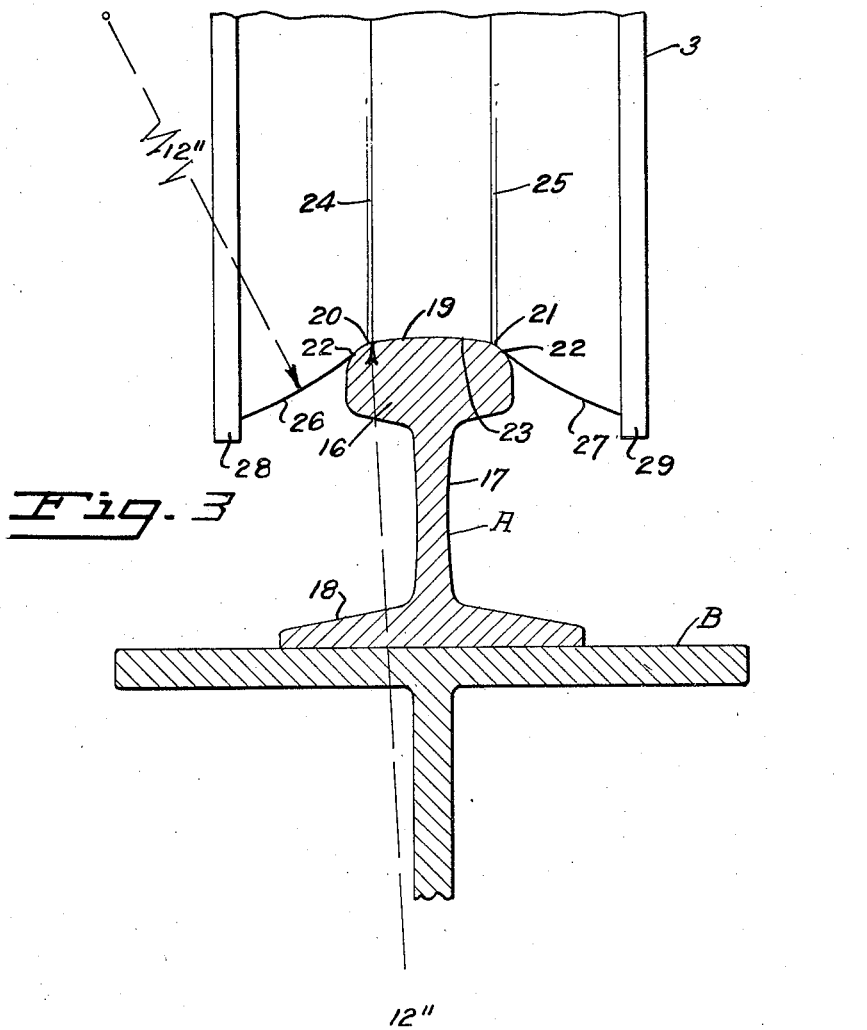

Patented Nov. 22, 1949

2,488,523

UNITED STATES PATENT OFFICE 2,488,523

MONORAIL WHEEL

Anson S. Bilger, San Francisco, Calif.

Application August 18, 1947, Serial No. 769,247

3 Claims. (Cl. 104—1)

This invention relates to a monorail railway of the suspended type and especially to the shape and structure of the wheels which ride the monorail and from which the rolling stock and load to be transported is suspended. A mechanism of this type is shown in my co-pending application, Serial No. 762,261, filed July 21,1947, for "Monorail truck."

The object of the present invention is generally to improve and simplify the construction and operation of wheels of the character described; to provide a wheel for use in conjunction with a monorail system which will insure safety and economy under all conditions of service and speed; to provide a wheel which permits perfect natural banking by pendulum action when rounding curves and which is substantially free from flange friction, vibration, or sliding movement on straight-way tracks and when rounding curves, and which is capable of taking curves of an exceedingly small radius; and further, to provide a wheel which tends at all times to center itself with relation to the rail upon which it travels.

The invention is shown by way of illustration in the accompanying drawings in which;

Fig. 3 is an enlarged view of the monorail and a portion of a wheel riding thereon.

Figure 1:
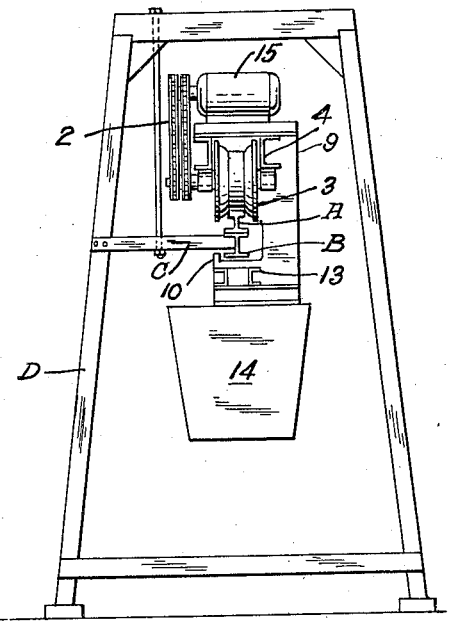
Fig. 1 is a front view of one form of tower or standard supporting the monorail and a car suspended therefrom.

Referring to the drawings in detail, A indicates a standard rail welded or otherwise secured to a beam B which in turn is secured to a cross arm C carried by suitable spaced standards or towers. one of which is indicated at D.

Supported by wheels 3 riding on the track is a truck 4 and suspended from the truck by a pair of hanger arms 9 is a car 14 which may be constructed to carry passengers, freight or otherwise. Beams 13 extend longitudinally of the top of the car and form a rigid connection between the car and the hanger arms, and also form a support for a swing gage 10 whereby pendulum swing or sway of the car when acted upon by the wind pressure or when rounding curves is limited or controlled.

Power in the form of an internal combustion engine, an electric motor, or otherwise, to drive the car may be carried by the truck as indicated at 15 and transmits power to the wheels 3 in any suitable manner as by the chain drive indicated at 2.

The invention is particularly directed to the wheels 3. The rail A upon which the wheels travel is a standard form of rail such as employed in general railway service. Such rails comprise a head portion 16 (see Fig. 3), a web 17 and a base 18. In the present instance let it be supposed that a standard thirty pound rail is used. If that is the case, it will be found that the upper face presents a curved surface 19 and that the radius of this curve is twelve inches. This radius increases with increase of size and weight of rails, and conversely decreases as the rail size decreases. The exact radius is not important, but it is important that the surface of the wheel 3 which contacts or rides on the rail is curved and that the curve is complementary to the surface of the rail, as will hereinafter appear.

The curved upper surface 19 of the rail head represented by the twelve inch radius extends from the point 20 to the point 21 and no further as the opposite sides of the rail head are sharply rounded off at these points on the radius indicated at 22. The total width of a thirty pound rail head is approximately one and eleven-sixteenths inches and the portion thereof having the twelve inch radius is approximately three-fifths of the total width. The complementary curved surface 23 on the wheel 3 extends from the point 24 to the point 25. From these points the wheel presents angularly disposed annular faces such as indicated at 26 and 27 and these faces finally terminate in annular flanges 28 and 29.

When using a thirty pound rail the width of the rail head is one and eleven-sixteenths inches, the top surface as already stated has a twelve inch radius and this terminates in a radius of five-eighths of an inch at each side. The side sections or surfaces 26 and 27 of the wheel are convex, the curvature of said surfaces being struck on a radius of 12 inches which is opposed to the 12 inch radius of the center section of the wheel. This at once forms a needed seat in the center of the wheel. Whenever or wherever the wheel tries to climb to one side or another of the central section, as when rounding a curve or the like, the convex surfaces will not only offer a minimum of surface to the rail thereby minimizing any friction tendencies, but also it should be noted that if there is a tendency to climb to one side or the other the corresponding convex surface will engage the five-eighth inch radiuses at one side or the other of the rail head and as these radiuses are opposed to the convex surfaces engaging the same the wheel will quickly return to the center section where it belongs.

From the foregoing it is evident that the wheels employed have an annular rail contacting or riding portion 23 disposed centrally thereof with a cross sectional curvature complementary to the rail head surface, further, that angular annular faces 26 and 27 are disposed on opposite sides of the track engaging portion and that these faces terminate in annular flanges 28 and 29.

The above structural features are important. For instance, if the complementary surface on the wheel has the same cross-sectional curvature as the top surface of the rail head, the wheels become self-tracking, or in other words tend at all times to ride on and to assume a central position on top of the rail, and as the central track engaging portion of the wheel has the same width as the complementary surface on the rail, there would appear to be a pivotal movement between the wheel surface and the rail surface when the car swings as a pendulum, for instance when rounding a curve. That is, it would appear that the movement of the wheel with relation to the rail surface would be similar to a bearing which is partially rotated about a stationary shaft. If that was the case, there would be actual lateral sliding movement between the wheel surface and the rail surface which would result in heavy friction, wear and vibration, but that is not the case as the wheels are rolling over the surface of the rail when approaching and rounding a curve and the pendulum movement is gradual; hence, the wheel rolls from its vertical position to the final tilted position which it assumes due to pendulum action when rounding a curve, thus eliminating wear and vibration.

If for any reason a wheel should tend to leave the rail or assume a position where it commences to ride on either one or another of the angular curved surfaces 26 and 27, these surfaces would instantly direct the wheel back to its normal position as they function in a manner similar to the crown surface of a belt pulley.

The curved side faces serve another function, to wit: that of preventing derailment because if a wheel should gradulally ride outwardly on one of these faces, the diameter gradually becomes greater thereby lifting the truck 4 and the car 14 vertically with relation to the rail and as there is only a comparatively small vertical clearance between the swing gage 10 and the lower face of the track supporting beam B, it is obvious that the swing gage will engage the under surface before the wheel can climb a sufficient distance to permit derailing. Of course, there is further protection by providing the annular flanges 28 and 29 but these are actually not necessary as the swing gage engages the lower surface of the beam before these flanges are reached. It is for this reason that the flanges 28 and 29 are actually unnecessary.

In view of the foregoing, there can be no friction between the flanges 28 and 29 and the rail and there is no friction set up when rounding a curve. Hence, practically all sources of friction and vibration commonly encountered in standard railroad practice have been reduced to the vanishing point. This result is reflected to all rods, bolts and braces, for instance in the tower structures and supports as well as in the structure of the rolling stock and other equipment, thereby reducing power consumption, maintenance and replacements, not to speak of first cost as the size of structural members, bracing, foundations, etc., may obviously be less under such favorable operating conditions.

Figure 2:
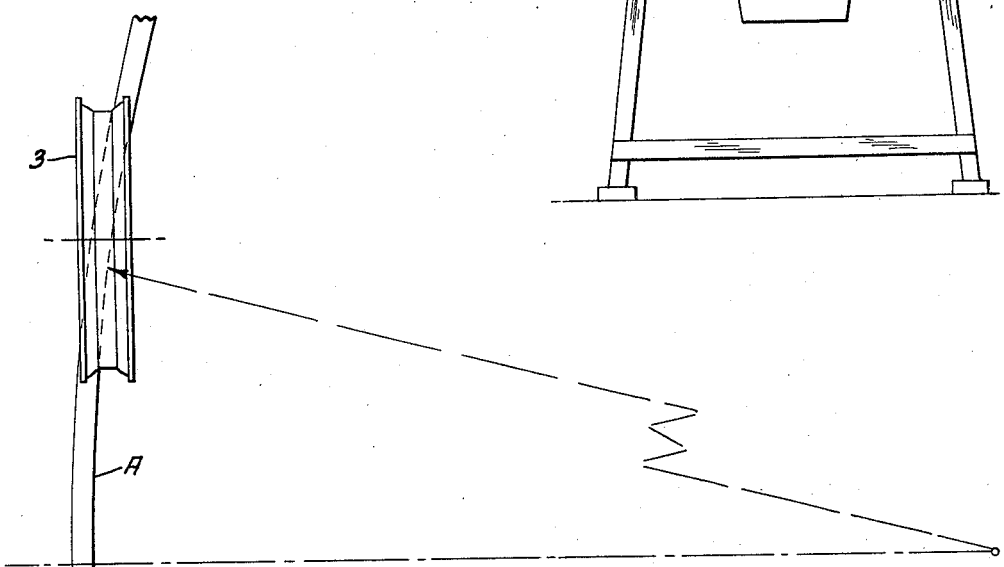
Fig. 2 is a plan view of a curved rail showing the position assumed by two wheels when rounding a curve.
Figure 2:
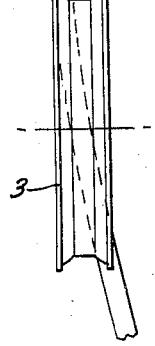

Due to the complementary curved faces formed between the wheel and rail head, uniform traction is assured at all angles of the wheel with relation to the track both on straight-way and curves and natural banking due to pendulum action when rounding curves and also when acted upon by wind pressure is assured with a minimum of friction, vibration or sliding movement. The position of the wheels when rounding a curve is best shown in Fig. 2. Curves of exceedingly small radius may be traversed. The flanges 28 and 29 must not contact the sides of the rails when rounding a curve; hence, with curves of small radius the flange width must be governed accordingly. In Fig. 2 two wheels are shown as rigidly mounted one at each end of a truck. Obviously each wheel may be provided with a truck and each truck may be swiveled to a main truck and if this is the case the radius of the rail curve may be further shortened. The wheels may of course be mounted in anti-friction bearings. Their faces may be chilled hardened. They may be made of a diameter to suit rails of different size, etc., and while this and other features of the invention have been more or less specifically described and illustrated, it should be understood that changes may be resorted to within the scope of the appended claims.

Having thus described my invention, what I claim and desire to secure by Letters Patent is:

1. In a suspended monorail system of the character described including a railway rail having a head portion presenting a curved transverse surface of a predetermined radius, a load-carrying wheel adapted to ride on said rail, said wheel presenting a central annular load-carrying surface engaging the surface of the rail and said surface being transversely curved on a radius substantially the same as the radius of the rail surface, and a pair of secondary annular surfaces on the wheel, one on each side of the central surface and forming a continuation thereof, said secondary surfaces being disposed on an acute angle with relation to the axis of rotation of the wheel and both presenting surfaces curved convexly toward the rail.

2. A load-carrying wheel adapted to ride on a railway rail having a head portion presenting a curved upper surface of a predetermined radius, said wheel presenting a central annular surface having a transverse line engagement with the surface of the rail and said central surface having a radius substantially identical with the radius of the rail surface, a pair of secondary annular surfaces on the wheel, one on each side of the central surface and forming a continuation thereof, said secondary surfaces being convex toward the rail and the curvature of said convex surfaces being of substantially the same radius as the curvature of the central annular surface of the wheel.

3. For use in a suspended monorail system of the character described including a railway rail having a head portion presenting a curved upper surface of a predetermined radius, a load-carrying wheel adapted to ride on said rail, said wheel presenting a central annular surface engaging the surface of the rail and said surface having a radius substantially the same as the radius of the rail surface whereby said surfaces have a transverse line engagement, a pair of secondary annular surfaces on the wheel, one on each side of the central surface and forming a continuation thereof, said surfaces being convex toward the rail and the curvature of said convex surfaces being substantially the same as the curvature of the central annular surface of the wheel, said secondary surfaces being disposed on an acute angle with relation to the central axis of rotation of the wheel, and annular flanges on each side of the wheel and exterior of the secondary annular surfaces, said annular flanges being of larger diameter than said secondary surfaces and being disposed substantially at right angles to the axis of rotation of the wheel.

ANSON S. BILGER.

REFERENCES CITED

The following references are of record in the file of this patent:

UNITED STATES PATENTS

| Number | Name | Date |
| --- | --- | --- |
| 919,268 | Vogt | Apr. 20, 1909 |
| 976,543 | Boynton | Nov. 22, 1910 |
| 1,596,166 | Everett | Aug. 17, 1926 |
| 2,046,448 | DeBuigne | July 7, 1936 |

FOREIGN PATENTS

| Number | Country | Date |
| --- | --- | --- |
| 328,564 | France | July 16, 1903 |